US010619923B2

(12) United States Patent
Latein et al.

(10) Patent No.: US 10,619,923 B2
(45) Date of Patent: Apr. 14, 2020

(54) CONTINUOUS-FLOW DRYER COMPRISING A FIRST AND A SECOND SECTION

(71) Applicant: STELA Laxhuber GmbH, Massing (DE)

(72) Inventors: Tobias Latein, Erlbach (DE); Thomas Christian Laxhuber, Massing (DE)

(73) Assignee: STELA Laxhuber GmbH, Massing (DE)

( * ) Notice: Subject to any disclaimer, the term of this patent is extended or adjusted under 35 U.S.C. 154(b) by 98 days.

(21) Appl. No.: 15/960,599

(22) Filed: Apr. 24, 2018

(65) Prior Publication Data

US 2018/0306506 A1 Oct. 25, 2018

(30) Foreign Application Priority Data

Apr. 24, 2017 (DE) ........................ 10 2017 108 695

(51) Int. Cl.
*F26B 25/06* (2006.01)
*F26B 23/00* (2006.01)
(Continued)

(52) U.S. Cl.
CPC .............. *F26B 23/002* (2013.01); *F26B 3/04* (2013.01); *F26B 17/04* (2013.01); *F26B 21/04* (2013.01); *F26B 23/02* (2013.01); *Y02P 70/405* (2015.11)

(58) Field of Classification Search
CPC ...... F26B 23/002; F26B 23/007; F26B 23/02; F26B 17/04; F26B 21/04; F26B 3/04; F26B 3/06; Y02P 70/40; Y02P 70/405
(Continued)

(56) References Cited

U.S. PATENT DOCUMENTS 2,113,035 A * 4/1938 Shaw ........................ C14B 1/58
34/191
3,849,904 A * 11/1974 Villalobos ................ D21F 5/00
34/636
(Continued)

FOREIGN PATENT DOCUMENTS

DE 506267 9/1930
DE 2941037 A1 4/1980
(Continued)

OTHER PUBLICATIONS

European Patent Office, Search Report in parallel application EP 18 16 8864, dated Jul. 24, 2018.

*Primary Examiner* — John P McCormack
(74) *Attorney, Agent, or Firm* — Smartpat PLC

(57) ABSTRACT

A continuous-flow dryer for drying a material by hot air is provided with a first and a second section, through which the material is passed successively in a transport direction. It includes a fresh air supply device, an exhaust air recirculation device for removing exhaust air and recirculating it as supply air, and a heat exchanger, through which fresh air and exhaust air are led, for transferring waste heat of the exhaust air into the fresh air. With the exhaust air recirculation device a first part of the exhaust air is removed from the first section and recirculated as supply air directly into the first section. Furthermore, a second part of the exhaust air is removed from the first section, led through the heat exchanger, and recirculated as supply air into the first section. The fresh air supply device supplies fresh air as supply air into the second section.

10 Claims, 1 Drawing Sheet

(51) Int. Cl.

| | |
|---|---|
| ***F26B 3/04*** | (2006.01) |
| ***F26B 17/04*** | (2006.01) |
| ***F26B 21/04*** | (2006.01) |
| ***F26B 23/02*** | (2006.01) |

(58) Field of Classification Search

USPC ......... 34/467, 443, 474, 475, 487, 493, 507, 34/510, 72, 209, 210, 218–220, 86, 236, 34/212

See application file for complete search history.

(56) References Cited

U.S. PATENT DOCUMENTS

| | | | | |
|---|---|---|---|---|
| 4,255,870 | A * | 3/1981 | Malmquist | F26B 21/04 34/212 |
| 7,581,334 | B2 * | 9/2009 | Majima | F26B 13/10 34/212 |

FOREIGN PATENT DOCUMENTS

| | | | |
|---|---|---|---|
| DE | 10253558 | | 5/2004 |
| DE | 102014200751 | A1 | 7/2015 |
| WO | 2015127490 | A1 | 9/2015 |
| WO | 2017133727 | A1 | 8/2017 |

* cited by examiner

CONTINUOUS-FLOW DRYER COMPRISING A FIRST AND A SECOND SECTION

TECHNICAL FIELD

The invention relates to a continuous-flow dryer for drying a material by means of hot air, comprising a first and a second section, through which the material flows successively in a transport direction, comprising a fresh air supply device for supplying fresh air as supply air, comprising an exhaust air recirculation device for removing exhaust air and recirculating it as supply air and comprising a heat exchanger, through which the fresh air on the one hand and the exhaust air on the other hand are led, for transferring waste heat of the exhaust air into the fresh air.

BACKGROUND

Continuous-flow dryers are dryers, in which material to be dried is transported continuously or in batches through the dryer. Such a dryer is in particular a belt dryer which conveys the material to be dried through the continuous-flow dyer by means of a belt. The material to be dried, for example sewage sludge, wood chips, hogged wood, RDF (refuse-derived fuel), SSW (solid shredded waste), MSW (municipal solid waste), household waste, grass or agricultural products and by-products such as sugar beet pulp, is here at first damp or wet. The material is dried by moisture being removed from it by means of hot air. The hot air is separately produced by heating in particular air from the surroundings of the continuous-flow dryer. On heating the air, the relative air moisture of this air decreases, the air becomes “drier”. This hot air with low relative air moisture then flows through and around the constituents to be dried in the continuous-flow dryer.

For heating the air to hot air, energy is of course needed. This energy is lost when the hot air generated is discharged into the surroundings after the drying of the material. First steps for circulating the hot air are therefore known.

The material to be dried is at the same time conveyed in a transport direction through the continuous-flow dryer and in so doing preferably runs through at least two sections. The individual section divides the continuous-flow dryer spatially. The sections can for this purpose be largely separated from one another in terms of air flow. Different air flows are thus possible in the sections, which can each have different relative air moistures and different temperatures.

For supplying air to the continuous-flow dryer a fresh air supply device is provided, which supplies generally dry fresh air, removed from the surroundings, to the continuous-flow dryer as supply air.

In the case of such continuous-flow dryers it is further known to provide an exhaust air recirculation device, by means of which exhaust air is removed from the drying process and then at least partly recirculated into the continuous-flow dryer. In so doing, a part of the exhaust air is led through a heat exchanger, through which also supplied fresh air is led. Thus, thermal energy or waste heat from the exhaust air can be transferred to the supply air.

SUMMARY

The object on which the invention is based is to provide a continuous-flow dryer for drying a material by means of hot air which makes possible a further energy saving compared with known continuous-flow dryers.

This object is achieved according to the invention with a continuous-flow dryer for drying a material by means of hot air, which is provided with a first and a second section, through which the material is passed successively in a transport direction, which is provided with a fresh air supply device for supplying fresh air as supply air, which is provided with an exhaust air recirculation device for removing exhaust air and recirculating it as supply air, and which is provided with a heat exchanger, through which fresh air on the one hand and exhaust air on the other hand are led, for transferring waste heat of the exhaust air into the fresh air. According to the invention, with the exhaust air recirculation device a first part of the exhaust air is to be removed from the first section and recirculated as supply air directly into the first section. With the exhaust air recirculation device, furthermore a second part of the exhaust air is to be removed from the first section, led through the heat exchanger and recirculated as supply air into the first section. By means of the fresh air supply device the fresh air is to be supplied as supply air into the second section.

The invention is furthermore also directed to a method for operating a continuous-flow dryer for drying a material by means of hot air, in which material is passed successively in a transport direction through a first and a second section, fresh air is supplied as supply air, exhaust air is removed and recirculated as supply air and by means of a heat exchanger waste heat is transferred into the fresh air. According to the invention, a first part of the exhaust air is removed from the first section and recirculated as supply air directly into the first section, a second part of the exhaust air is removed from the first section, led through the heat exchanger and recirculated as supply air into the first section, and the fresh air is supplied as supply air into the second section.

In the continuous-flow dryer according to the invention, an exhaust air recirculation device is provided, by means of which exhaust air from a drying process is removed from the first section of the continuous-flow dryer. This exhaust air is partly directly recirculated into the first section of the continuous-flow dryer. A second part of the exhaust air is led, according to the invention, from the first section of the continuous-flow dryer to a heat exchanger, at which thermal energy or waste heat is transferred from the exhaust air likewise to supply air flowing through the heat exchanger. The two flows of exhaust air and supply air are in this case separated from one another in particular at the heat exchanger by means of a separating surface. At the separating surface on one side the exhaust air flows along and on the other side the supply air flows along. Thermal energy of the exhaust air is released to the supply air through the separating surface. The waste heat of the exhaust air thus heats the air supplied to the continuous-flow dryer, which is in particular fresh air. Therefore, thermal energy is recovered from the exhaust air. At the same time, the air flows of exhaust air and supply air are separated from one another in terms of moisture. The moisture contained in the exhaust air cannot therefore pass over into the supply air.

In the continuous-flow dryer according to the invention, furthermore a fresh air supply device is provided, which supplies generally dry fresh air from the surroundings to the continuous-flow dryer as supply air. According to the invention, this freshly supplied supply air is supplied to a second section of the continuous-flow dryer which is situated in the flow direction of the material after the first section. The supply air here is led through the above-mentioned heat exchanger.

With the solution according to the invention, exhaust air is led from a first part of the material flow in order to preheat supply air. The exhaust air is thus taken from a part or a section of the continuous-flow dryer in which the material is still comparatively moist. Owing to the high moisture content of the material, the exhaust air there is likewise intensely saturated with moisture. In particular, the exhaust air in this part or this section of the continuous-flow dryer is completely saturated in its entire extent. It has throughout a moisture content of 100% when it is taken from the first section by means of the exhaust air recirculation device. According to the invention, a part of this exhaust air is led through a heat exchanger and thus heats supply air. On the transfer of waste heat of the exhaust air in this way, a particularly high proportion of energy can be transferred from the exhaust air to the supply air owing to the thermodynamic conditions prevailing then. Furthermore, particularly advantageously supply air is preheated, which subsequently is provided for the rear part or the second section of the continuous-flow dryer. For this, supply air must have a comparatively high temperature in order to be able to dry the material substantially completely, as desired. In order to achieve this high temperature, a high energy input into the supply air on preheating is accordingly very advantageous. Furthermore, owing to the high temperatures desired here as regards the preheating to be achieved, there is no upper limit. The maximum amount of energy can therefore be transferred from the exhaust air.

The solution according to the invention makes it possible for the material at the end, i.e. in the second section, to be dried with supplied fresh air. This is particularly advantageous when the material for reducing dust entry is to be dried with particularly pure air.

Advantageously, the heat exchanger according to the invention is dimensioned in such a manner that moisture from the exhaust air condenses out on it. Moisture condenses out when the relative air moisture of the respectively relevant air has reached 100% (in words: one hundred percent). The relative air moisture in air increases when the air, as in this case the hot exhaust air, cools. The condensing-out sought according to the invention is preferably achieved by the moisture condensing out on a separating surface of the heat exchanger. For this the exhaust air releases so much thermal energy to the separating surface that the relative air moisture in the exhaust air reaches 100%. The first heat exchanger according to the invention thus advantageously has three functions. The first function is the dehumidifying of the exhaust air which flows through the first heat exchanger. The second function is the heating-up of the supplied fresh air. The third function is the reducing of the relative air moisture of the supplied fresh air, caused by the heating-up of this fresh air.

According to the invention, preferably furthermore a first heater is provided, by means of which the supply air is to be heated up before its recirculation into the first section. The heater is, for example, a hot-water heat exchanger, a steam heat exchanger, an electrical heating device or a heating burner, by means of which the air led through it is heated by the energy supply. On heating the air with the heater, the relative air moisture of this supply air falls, as already mentioned above. A low air moisture on drying is advantageous because such supply air can then absorb more water again. Warmer supply air can thus absorb more water than colder supply air. The supply air is, according to the invention, firstly withdrawn from the first section and then supplied to this first section again. In this first section the moisture of the material to be dried is still at its highest with regard to its conveying direction. Therefore, by recirculating drying air this drying air is advantageously saturated with moisture multiple times.

Advantageously, furthermore a second heater is provided, by means of which the supply air is to be heated up before its recirculation into the first section. The supply air has been removed from the first section and then, according to the invention, led through the heat exchanger. This supply air has therefore been separately cooled, so that a renewed heating-up for a renewed saturation of the supply air with moisture is appropriate. With the second heater, the supply air is thus heated-up after it has been passed through the heat exchanger. The second heater thus reduces the relative air moisture of this supply air. Because the material to be dried in the first section, however, is still particularly moist, there is a large margin for the lowering of the relative air moisture of this supply air. It can, but does not absolutely have to be, greatly reheated. The exhaust air can nevertheless be substantially completely saturated again. At the heat exchanger according to the invention and the aforementioned heaters, large control ranges are thus available.

An advantage of the solution according to the invention lies in that the second heater for heating the recirculated, in particular condensed-out supply air, can be of small design. Particularly advantageously, this second heater can even be completely omitted.

In order to fully utilize the above-mentioned control ranges, advantageously a device, in particular in the form of a flap, is used, by means of which the amount of the first partial exhaust air in relation to the second partial exhaust air is to be controlled.

Advantageously, furthermore a removal device for removing a third partial exhaust air from the first section is to be provided. The exhaust air removed here is therefore completely eliminated from the first section and is to be replaced accordingly by further supply air. With the complete removal of air from the first section in this manner, a negative pressure arises overall in this section, whereby a removal of dust from the first section into the surroundings of the continuous-flow dryer can be avoided.

The removal device for removing a third partial exhaust air from the first section is preferably arranged in the flow direction of the exhaust air after the heat exchanger. Therefore, preferably the exhaust air to be removed totally from the first section is removed from the air flow only after the heat exchanger. With such air guidance, firstly only the waste heat of this exhaust air can still be withdrawn at the heat exchanger, until it is then totally removed, in particular is discharged into the surroundings of the continuous-flow dryer.

The exhaust air recirculation and/or the fresh air supply are preferably each provided with a suction device, by means of which the air to be conveyed is firstly sucked through the material to be dried and then recirculated or removed. By sucking the air in this way and not by blowing, a negative pressure can be produced within the material and the aforementioned sections, which prevents dust from these regions getting to the outside.

Advantageously, in at least one of the sections, there is further provided an exhaust air sensor by means of which in the exhaust air its moisture is to be determined. Such an air sensor determines in particular the relative air moisture and/or the temperature of the air flowing against or around it. Advantageously, the relative air moisture of the exhaust air is thus to be determined by means of the exhaust air sensor. When the relative air moisture of the exhaust air is known, it is possible by means of a control to define whether this exhaust air is to be dehumidified or whether this air is to be supplied directly to the respective section or the respective region again.

Alternatively or additionally, a supply air sensor is further provided, by means of which in the supply air its moisture is to be determined. The supply air sensor determines the relative air moisture of the flowing-against supply air. It is thus advantageous to determine the relative air moisture with which the supply air flows into the respective section. It is thus particularly advantageous also to determine whether and by how many degrees Celsius the supply air is to be additionally heated by a heater to achieve a desired relative air moisture in the supply air.

In a preferred manner, for transporting the material through the continuous-flow dryer two belts are further provided, which are assigned in particular to the first section and the second section. Such a two-part belt in a continuous-flow dryer makes it possible for each of the two sections to have their own belt. Thus, the two sections can also be arranged spatially separated from each other, in particular above each other.

Further, preferably also a regulating device is provided, by means of which the moisture in the exhaust air is to be measured and an air guide in the exhaust air recirculation device, in the first heat exchanger and/or in the second heat exchanger is to be regulated. A regulating device or control evaluates inputs of the regulating device and regulates or controls by means of logic of the regulating device its outputs. Electrical signals of sensors of different type, such as for example a temperature sensor or a moisture sensor, serve as inputs here. Mostly switches or electrical signals, for example for controlling the heater, serve as outputs. By means of the regulating device, advantageously the air guide, in particular by means of ventilation, in the exhaust air recirculation device is to be adapted to the respectively prevailing relative air moisture of the exhaust air.

BRIEF DESCRIPTION OF THE DRAWINGS

An exemplary embodiment of the solution according to the invention is explained in more detail below with the aid of the appended schematic drawings, in which.

DETAILED DESCRIPTION

Figure 1:
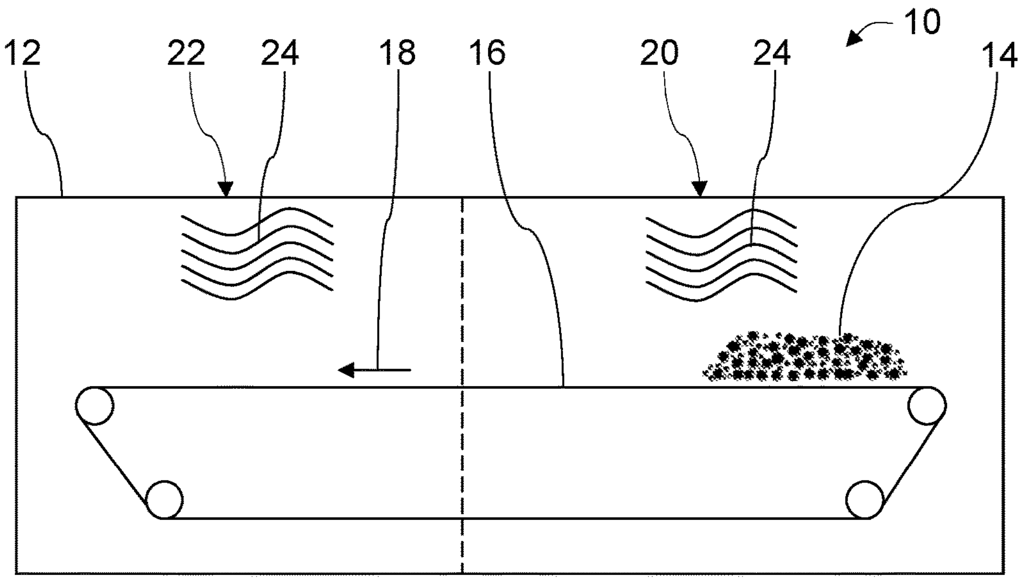
FIG. 1 shows a highly simplified longitudinal section of a continuous-flow dryer according to the prior art and FIG. 2 shows a highly simplified longitudinal section of a continuous-flow dryer according to the invention.
Figure 2:
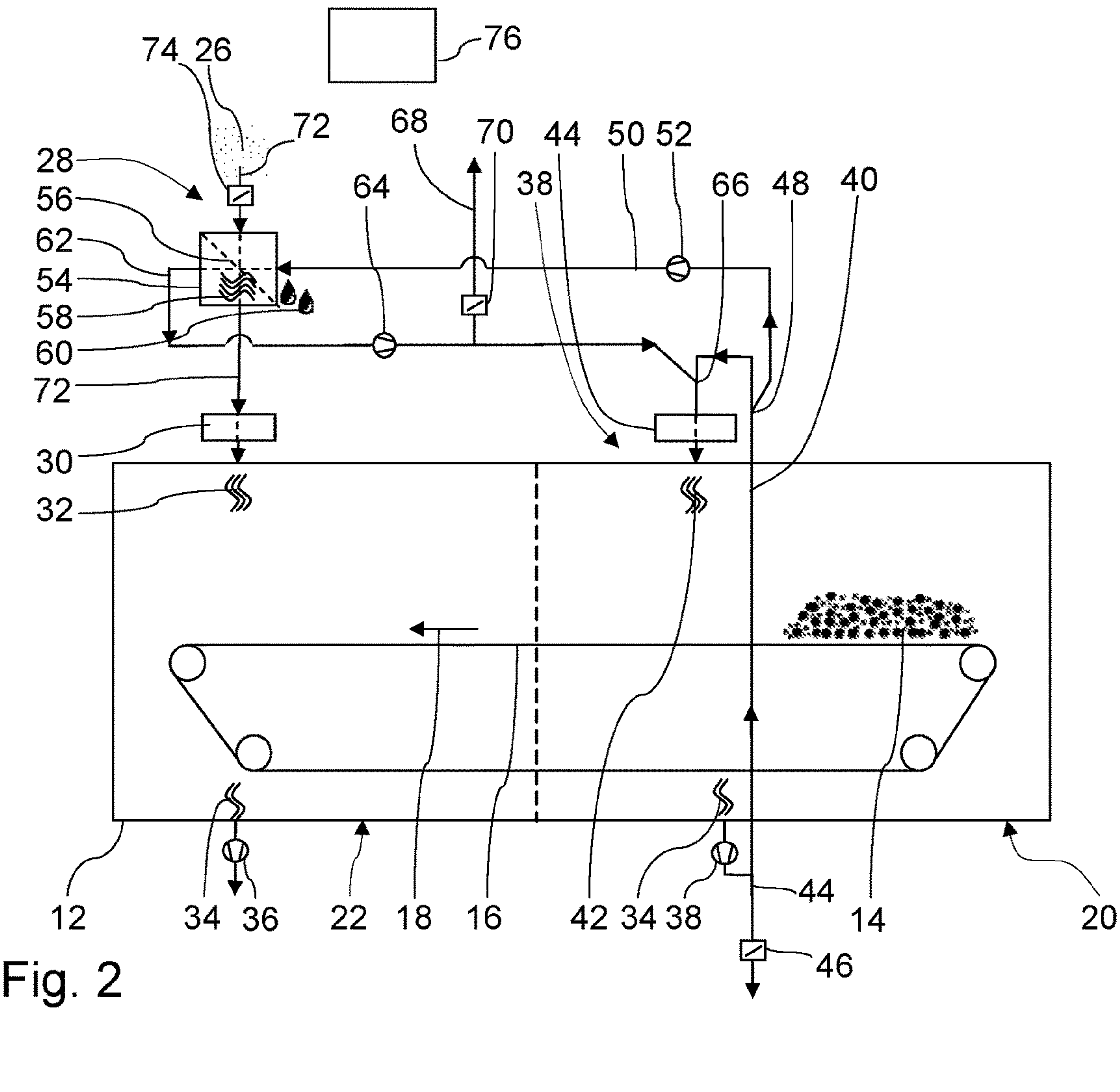

In FIGS. 1 and 2 there is each shown a continuous-flow dryer 10 in the form of a belt dryer. The continuous-flow dryer 10 has a housing 12, through which the initially moist or wet material 14 is to be transported by means of a belt 16 in a transport direction 18 through the continuous-flow dryer 10.

During transport, the material 14 passes firstly through a first section 20 and after that a second section 22. The two sections 20 and 22 divide the housing 12 spatially. In the transport direction they are largely separated from one another in terms of air flow, if necessary, by means of one dividing wall or a plurality of dividing walls. The sections 20 and 22 can also for their part be further subdivided into subsections.

Within the housing 12 there is hot air 24 which withdraws moisture (not shown) from the material 14 to be dried. With the withdrawing of moisture from the material 14, the material 14 becomes drier, it is dried.

FIG. 2 illustrates how such a material 14 is dried by means of hot air in the continuous-flow dryer 10, according to the invention, there. For drying, fresh air 26 flows from outside the housing 12, conveyed by a fresh air supply device 28, into the housing 12. The fresh air 26 flows through a first heater 30 which heats the fresh air 26 on its way through the heater 30. With the heating of the fresh air 26, the relative air moisture of the fresh air 26 decreases, the fresh air 26 becomes "drier".

This fresh air 26, after the heating, is referred to as the supply air 32. The supply air 32 flows into the section 22 and there flows around the individual particles of the material 14 or it flows through the layer of the material 14 on the belt 16. On this flowing around the particles of the material 14, the supply air 32 takes up moisture from the material 14. The relative air moisture of the supply air 32 increases, the supply air 32 becomes "more moist". The moistened supply air 32 is subsequently discharged from the housing 12 into surroundings thereof from the section 22 as exhaust air 34 by means of an exhaust air outlet 36 with a fan. This exhaust air 34 thus constitutes outgoing air.

Before the material 14 reaches the second section 22, it passes through the first section 20. In the section 20, exhaust air 34 is discharged at the bottom. This exhaust air 34 is led by means of an exhaust air recirculation device 38, which comprises in particular a fan, to a recirculation line 40. Through the recirculation line 40, this exhaust air 34 is largely recirculated again into the section 20 as supply air 42.

A flap 46 can be connected to the recirculation line 40, through which flap a part of the exhaust air 34 can be discharged directly into the surroundings of the continuous-flow dryer 10.

At the outlet of the recirculation line 40 there is arranged a heater 44, by means of which the recirculated exhaust air 34 can be heated up before its re-entry as supply air 42 into the section 20. The heater 44 may be, but does not necessarily have to be, provided. Alternatively, the heater 44 can also have a comparatively small heat capacity. The exhaust air 34 from the section 20 is thus largely recirculated directly as supply air 42 into the section 20 by means of the exhaust air recirculation device 38.

The recirculation line 40 further has a branch 48, to which a line 50 is connected. At the branch 48, a part of the exhaust air 34 is branched off from the recirculation line 40 and led out by means of the line 50. For this purpose, a sucking fan 52 to be separately regulated can be arranged in the line 50. The line 50 leads the branched-off exhaust air to a heat exchanger 54, and through it.

The heat exchanger 54 comprises a separating surface 56, at which, on one side, the branched-off exhaust air 34 is led out of the first section 20 as heat-supplying air and, on the other side, the fresh air 26 is led along as heat-discharging air. At the separating surface 56, heat therefore changes from the exhaust air 34 as waste heat 58 to the fresh air 26. At the same time, water 60 condenses out of the exhaust air 34 at the separating surface 56 with the cooling of the exhaust air 34.

A recirculation line 62 leads the air, thus cooled and condensed out, as supply air 42 back into the first section 20. For this purpose, a sucking fan 64 to be separately regulated can be arranged in the recirculation line 62. The recirculation line 66 leads at a junction 66, in the flow direction after the branch 48, into the recirculation line 40.

In the flow direction shortly after the fan 64, a line 68 leading outwards into the surroundings of the continuous-flow dryer 10 branches off from the recirculation line 68 with a flap 70 arranged therein. This line 68 serves, with the associated flap 70, to discharge cooled exhaust air 34 from the recirculation line 62 into the surroundings.

With such a discharge of a part of the exhaust air into the surroundings of the continuous-flow dryer 10, a slight negative pressure arises in the section 20. To equalise this negative pressure, air from the surroundings of the continuous-flow dryer 10 is forced into the first section 20 from outside. At the same time, no air and thus also no dust can escape to the outside from the section 20. This supply of air from outside into the section 20 therefore prevents a dusting of the surroundings of the continuous-flow dryer 10.

The fresh air 26 is led by means of a supply line 72 through the heat exchanger 54 and, as explained above, through the heater 30 into the second section 22. In so doing, the amount of supply air 32 thus supplied is controlled by means of a flap 74 which is arranged in the supply line 72 before the heat exchanger 54.

The flaps and fans mentioned are controlled, and in particular regulated, altogether by means of a control 76, with various measuring devices and sensors (not shown) coupled to the control 76 being able to be provided.

LIST OF REFERENCE SYMBOLS

10 continuous-flow dryer
12 housing
14 material
16 belt
18 transport direction
20 first section
22 second section
24 hot air
26 fresh air
28 fresh air supply device
30 heater
32 supply air
34 exhaust air
36 exhaust air outlet
38 exhaust air recirculation device
40 recirculation line
42 supply air
44 heater
46 flap
48 branch
50 line
52 fan
54 heat exchanger
56 separating surface
58 waste heat
60 water
62 recirculation line
64 fan
66 junction
68 line
70 flap
72 supply line
74 flap
76 control

What is claimed is:

1. A continuous-flow dryer (10) for drying a material (14) by means of hot air (24), comprising:
- a first and a second section (20, 22), through which the material (14) is passed successively in a transport direction (18);
- a fresh air supply device (28) for supplying fresh air (26) as supply air (32);
- an exhaust air recirculation device (38) for removing exhaust air (34) and recirculating it as recirculated supply air (42); and
- a heat exchanger (54), through which the fresh air (26) on the one hand and the exhaust air (34) on the other hand are led, for transferring waste heat of the exhaust air (34) into the fresh air (26),
- wherein with the exhaust air recirculation device (38) a first part of the exhaust air (34) is to be removed from the first section (20) and recirculated as recirculated supply air (42) directly into the first section (20), and
- wherein with the exhaust air recirculation device (38) a second part of the exhaust air (34) is to be removed from the first section (20), led through the heat exchanger (54) and recirculated as recirculated supply air (42) into the first section, and
- wherein with the fresh air supply device (28) the fresh air (26) is to be supplied as supply air (32) into the second section (22).

2. The continuous-flow dryer according to claim 1,
- wherein the heat exchanger (54) is dimensioned such that water condenses out on it from the exhaust air (34).

3. The continuous-flow dryer according to claim 1,
- wherein a first heater (44) is provided, by means of which the recirculated supply air (42) is to be heated up before being recirculated into the first section (20).

4. The continuous-flow dryer according to claim 1,
- wherein a second heater (30) is provided, by means of which the supply air (32) is to be heated up before being led into the second section (22).

5. The continuous-flow dryer according to claim 1,
- wherein a device (38, 46, 52, 64, 70) for controlling an amount of the first part of the exhaust air (34) in relation to the second part of the exhaust air (34) is provided.

6. The continuous-flow dryer according to claim 1,
- wherein a removal device (68, 70) for removing a third part of the exhaust air (34) from the first section (20) is provided.

7. The continuous-flow dryer according to claim 6,
- wherein the removal device (68, 70) is arranged in flow direction of the exhaust air (34) after the heat exchanger (54).

8. The continuous-flow dryer according to claim 1,
- wherein the exhaust air recirculation device (38) is provided with a first suction device for sucking out exhaust air (34) from the first section (20).

9. The continuous-flow dryer according to claim 1,
- wherein the fresh air supply device (28) is provided with a second suction device for sucking out exhaust air (34) from the second section (22).

10. A method for operating a continuous-flow dryer (10) for drying a material (14) by means of hot air (24), in which:
- material (14) is passed successively in a transport direction (18) through a first and a second section (20, 22);
- fresh air (26) is supplied as supply air (32);
- exhaust air (34) is removed and recirculated as recirculated supply air (42);
- by means of a heat exchanger (54) waste heat (58) of the exhaust air (34) is transferred into the fresh air (26);
- a first part of the exhaust air (34) is removed from the first section (20) and recirculated as recirculated supply air (42) directly into the first section (20);
- a second part of the exhaust air (34) is removed from the first section (20), led through the heat exchanger (54) and recirculated as recirculated supply air (42) into the first section (20); and the fresh air (26) is supplied as supply air (32) into the second section (22).

* * * * *